United States Patent [19]

Eggers

[11] Patent Number: 6,135,753
[45] Date of Patent: Oct. 24, 2000

[54] THERMOFORMING MACHINE FOR THERMOPLASTIC CUPS

[76] Inventor: Thies Eggers, Reichenhain 21, D-51789 Lindlar, Germany

[21] Appl. No.: 09/241,921

[22] Filed: Feb. 2, 1999

[51] Int. Cl.$^7$ ..................................................... B29C 51/42
[52] U.S. Cl. ........................ 425/195; 425/384; 425/398; 249/81
[58] Field of Search ................................. 425/195, 398, 425/384, DIG. 239, 193, 547, 548, 552; 249/102, 155, 156, 81

[56] References Cited

U.S. PATENT DOCUMENTS

| Re. 27,435 | 7/1972 | Shelby | 425/167 |
| 669,330 | 3/1901 | Thurber . | |
| 3,518,725 | 7/1970 | Donofrio | 425/388 |

Primary Examiner—Harold Pyon
Assistant Examiner—Joseph S. Del Sole
Attorney, Agent, or Firm—Edwin D. Schindler

[57] ABSTRACT

A thermoforming station in a thermoforming machine for thermoplastic cups, which is equipped with a cyclically operating conveying section which takes over a cup sheet web from an unwinding station, the conveying section running through a heating station, the thermoforming station and further processing stations. The technical problem is a perfect and rapid cooling of the thermoplastic cups in the thermoforming station, in order to keep the cycle time as short as possible, and an adaptation of the thermoforming die to different heights of the thermoplastic cups. The lower die (7) of the thermoforming station (6) is constructed from intermediate plates (32) forming a plate stack, grooves (35) being made in the surface of the intermediate plates (32) for the purpose of forming cooling channels within the plate stack.

3 Claims, 2 Drawing Sheets

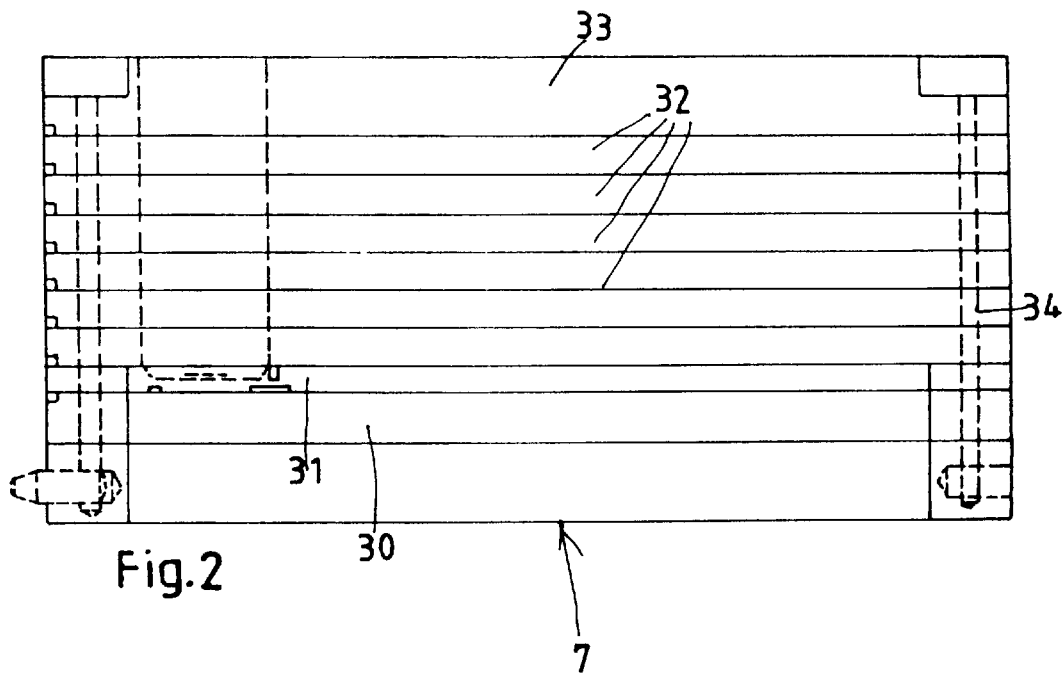
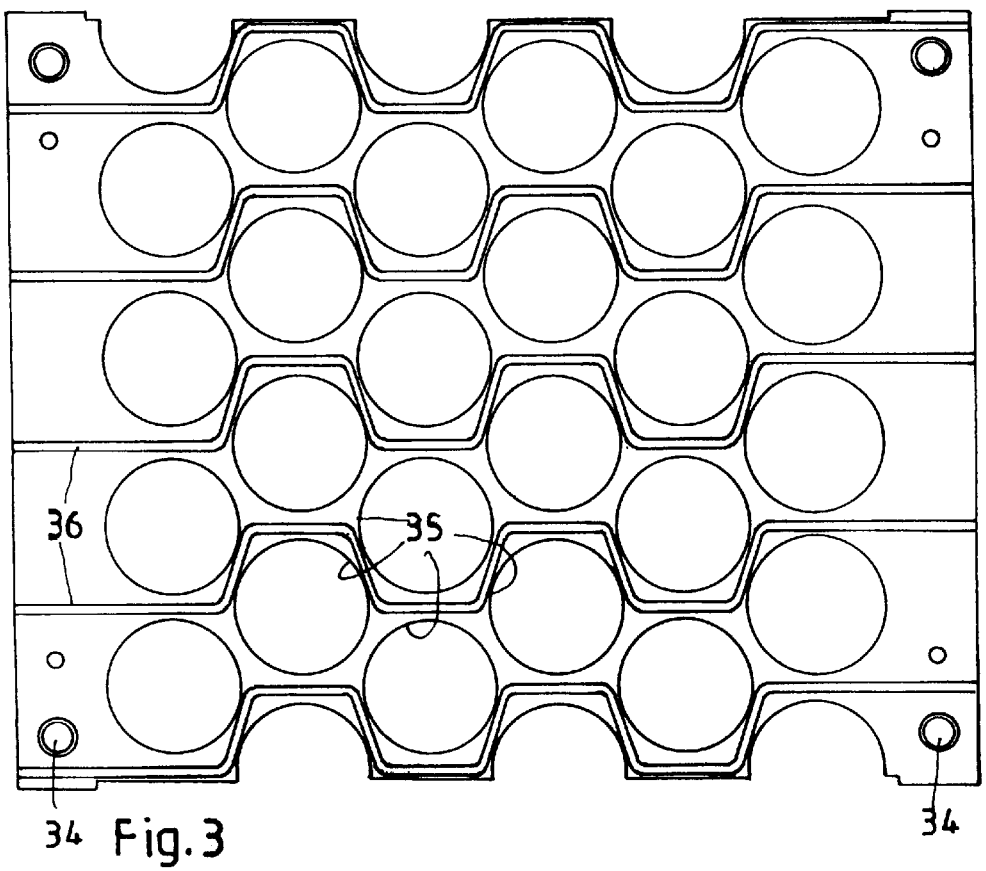

THERMOFORMING MACHINE FOR THERMOPLASTIC CUPS

BACKGROUND OF THE INVENTION

1. Technical Field of the Invention

The invention relates to a thermoforming station in a thermoforming machine for thermoplastic cups, which is equipped with a cyclically operating conveying section which takes over a cup sheet web from an unwinding station, the conveying section running through a heating station, the thermoforming station and further processing stations.

The field of application of the invention is the variable production of thermoplastic cups from a sheet. The thermoplastic cups receive food preparations such as cottage cheese or other milk products, pudding, jam, beverages or the like.

2. Description of the Prior Art

DE 3234506 C2 describes a thermoforming machine of the generic type mentioned. The lower die of the thermoforming station is provided with continuous cooling channels. Such a design is not possible, however, if the forming chambers for the thermoplastic cups are offset from one another.

DE 39 40 346 C1 shows the arrangement of the cooling channels within the thermoforming station, according to which the cooling channels run not only in the bottom but also in the webs between the individual forming troughs.

DE 44 18 064 C1 shows a multi-part design of the lower die of the thermoforming station. Forming troughs are inserted into an outer supporting structure, a coolant channel remaining free between supporting structure and forming trough.

U.S. Pat. No. 2,191,303 describes a die of sandwich-like construction for cooling heated plastics packaging sheets. In this construction, plates, and bars provided with milled-in coolant channels, are stacked alternately on top of one another. A cooling plate with a precisely defined through-flow is thus obtained.

SUMMARY OF THE INVENTION

The object of the invention is a perfect and rapid cooling of the thermoplastic cups in the thermoforming station, in order to keep the cycle time as short as possible, and an adaptation of the thermoforming die to different heights of the thermoplastic cups.

This object is achieved according to the invention by virtue of the fact that the lower die of the thermoforming station is constructed from intermediate plates forming a plate stack, grooves being made in the surface of the plates for the purpose of forming cooling channels within the plate stack.

The invention differs from the prior art in that the construction of the lower die from intermediate plates allows a fine adjustment to different heights. By milling channels in each intermediate plate it is possible to provide cooling channels in large numbers and of a desired shape, thereby ensuring rapid cooling. This results in a short cycle time.

Effective cooling of the thermoformed thermoplastic cups is achieved by virtue of the fact that the cooling channels run in each plate in a meandering fashion from one longitudinal side to the opposite longitudinal side.

BRIEF DESCRIPTION OF THE DRAWING FIGURES

An exemplary embodiment is explained with reference to the drawings, in which:

FIG. 2 shows a section through the lower die of the thermoforming station and

FIG. 3 shows a plan view of one plate of the lower die according to FIG. 2.

DETAILED DESCRIPTION OF THE DRAWING AND PREFERRED EMBODIMENTS

Figure 1:
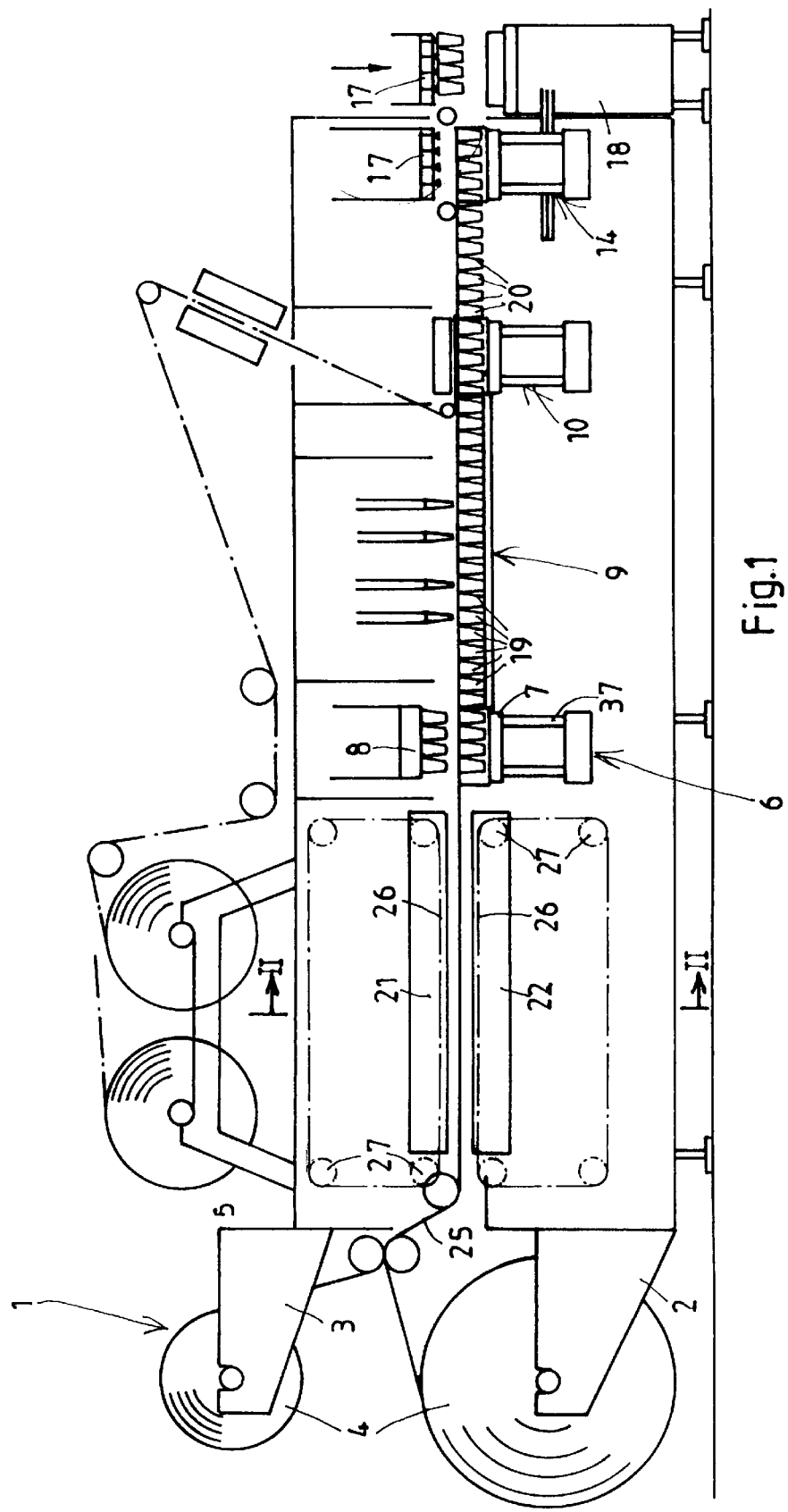
FIG. 1 shows a schematic general view of the machine.

FIG. 1 is a schematic general view of the thermoforming machine combined with a filling machine. It comprises the following essential stations for the processing of the thermoplastic cups:

an alternating unwinding station 1 with two unwinding receptacles 2, 3 for two reels 4 of thermoplastic sheets 25, which are alternately unwound;

a continuous conveying section with conveying rolls, holders and grippers (not shown in detail). The conveying section is set for a cyclical or batchwise movement of the thermoplastic sheet and the thermoplastic cups;

a heating station 5 for heating the thermoplastic sheet 25 to the thermoforming temperature;

a thermoforming station 6 with a lower die 7 and an upper die 8 in the form of thermoforming rams for forming the thermoplastic cups 19;

a filling station 9 for filling the thermoplastic cups 19;

a sealing station 10 for heat sealing a lid foil onto the filled thermoplastic cups;

a punching station 14 for separating and singularizing the sealed thermoplastic cups 20 with a discharge gripper 17 which picks up the separated thermoplastic cups 20 and conveys them into a packing station 18, where the separated thermoplastic cups 20 are put into trays, cartons, pallets or other transport containers. The following stations for final packaging are not shown.

FIG. 1 shows an online machine. Alternatively, the thermoplastic cups can also be put in intermediate storage following the thermoforming station 6, and filled and further processed separately.

According to FIG. 1, the heating station comprises an upper and a lower heating apparatus 21, 22 which extend over a plurality of cycle lengths of the conveying section and are designed as infrared radiation heaters. The infrared radiation heating makes it possible to heat the thermoplastic sheet to a high temperature in order to kill bacteria and germs. Furthermore, the heating station is adjustable in the conveying direction. This allows adaptation to different sizes of the thermoplastic cups and the cup batches.

Finally, roller curtains 26 running via rollers 27 are arranged between the heating apparatuses 21, 22 and the thermoplastic sheet 25. These roller curtains 26 are moved cyclically when the machine is started and successively free the heating devices 21, 22 in accordance with the feed cycles, so that the thermoplastic sheet batches are individually preheated. The temperature control and displacement of the roller curtains 26 are coupled to the thermoforming station, so that a constant prescribed temperature of the thermoplastic sheet for the thermoforming is always ensured.

FIGS. 2 and 3 show details of the lower die 7 of the thermoforming station 6. The lower die 7 is composed of a clamping plate 30, a base plate 31, a plurality of intermediate plates 32 and a top plate 33, these being clamped together in the customary fashion by bolts or pins 34. One intermediate plate 32 is shown in plan view in FIG. 3. The intermediate plates 32 contain forming chambers 35 for forming the thermoplastic cups 19 and furthermore grooves 36 which are made in the surface and run in a meandering fashion around the forming chambers 35 and which form cooling channels or have cooling pipes placed into them. The intermediate plates 32 are interchangeable, so that the lower die 7 can be adapted to different cup heights using an appropriate number of intermediate plates 32.

For different cup sizes and cup batches, the thermoforming die must be exchanged. The corresponding changes in length in the feed direction are compensated for by the adjustment of the heating apparatus as already mentioned.

The lower die 7 is arranged on a lifting table 37. The upper die 8 with the forming cores for the thermoplastic cups is movable in the manner of a press. The lower die 7 is equipped with a number of intermediate plates 32 corresponding to the desired height of the thermoplastic cups. In the course of the cyclical batchwise feed, a piece of heated thermoplastic sheet 25 is moved into the thermoforming station 6. The lower die 7 is moved upward and the upper die 8 downward, so that the forming cores enter the forming chambers 35 and form the thermoplastic cups. The thermoplastic cups 19 are cooled immediately as they are formed. The formed thermoplastic cups are then filled in the filling station and thereafter further processed.

What is claimed is:

1. A thermoforming station in a thermoforming machine for thermoplastic cups, comprising a cyclically operating conveying section for taking over a cup sheet web from an unwinding station, the conveying section running through a heating station, the thermoforming station and further processing stations, wherein a lower die of the thermoforming station is constructed from intermediate plates forming a plate stack, grooves being made in a surface of each of the intermediate plates, the grooves form cooling channels between the plates within the plate stack.

2. A thermoforming station as claimed in claim 1, wherein the cooling channels receive cooling pipes.

3. A thermoforming station as claimed in claim 1, wherein the cooling channels run in each intermediate plate in a meandering fashion from one longitudinal side to an opposite longitudinal side.

* * * * *